United States Patent
Kammerl et al.

(10) Patent No.: US 10,108,254 B1
(45) Date of Patent: Oct. 23, 2018

(54) APPARATUS AND METHOD FOR TEMPORAL SYNCHRONIZATION OF MULTIPLE SIGNALS

(71) Applicant: Google Inc., Mountain View, CA (US)

(72) Inventors: Julius Kammerl, San Francisco, CA (US); Neil Aylon Charles Birkbeck, Sunnyvale, CA (US); Anil Christopher Kokaram, Sunnyvale, CA (US); Caroline Rebecca Pantofaru, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 345 days.

(21) Appl. No.: 14/221,480

(22) Filed: Mar. 21, 2014

(51) Int. Cl.
  *G06F 17/00* (2006.01)
  *G06F 3/01* (2006.01)

(52) U.S. Cl.
  CPC ..................... *G06F 3/01* (2013.01)

(58) Field of Classification Search
  CPC . G06F 17/24; G06F 17/25; G06F 3/01; G06T 11/60; A63F 2300/5553; A63F 2300/6623
  USPC .................. 715/201, 202, 230, 255
  See application file for complete search history.

(56) References Cited

U.S. PATENT DOCUMENTS

| | | | |
|---|---|---|---|
| 7,996,771 B2 | 8/2011 | Girgensohn | |
| 8,854,457 B2 | 10/2014 | De Vleeschouwer | |
| 9,111,579 B2 * | 8/2015 | Meaney | G11B 27/031 |
| 2004/0090472 A1 * | 5/2004 | Risch | G06F 17/30716 |
| | | | 715/853 |
| 2010/0208064 A1 | 8/2010 | Liu | |
| 2012/0076357 A1 | 3/2012 | Yamamoto | |
| 2012/0198317 A1 * | 8/2012 | Eppolito | G11B 27/034 |
| | | | 715/202 |
| 2012/0257875 A1 * | 10/2012 | Sharpe | G11B 27/034 |
| | | | 386/278 |
| 2014/0037140 A1 | 2/2014 | Benhimane | |
| 2014/0294361 A1 | 10/2014 | Acharya | |
| 2015/0235367 A1 | 8/2015 | Langer | |
| 2016/0125267 A1 | 5/2016 | Goldman | |

OTHER PUBLICATIONS

Bryan, Nicholas J., Paris Smaragdis, and Gautham J. Mysore, "Clustering and Synchronizing Multi-Camera Video Via Landmark Cross-Correlation", Acoustics, Speech and Signal Processing (ICASSP), 2012 IEEE International Conference on IEEE, 2012, 4 pages.

(Continued)

*Primary Examiner* — Andrew R Dyer
*Assistant Examiner* — Jenq-Kang Chu
(74) *Attorney, Agent, or Firm* — Lowenstein Sandler LLP

(57) ABSTRACT

A method and system include identifying a plurality of media clips pertaining to an event, for each pair of the plurality of media clips, calculating pairwise relative time offsets for pairs of media clips from the plurality of media clips, calculating, by a processing device, an inconsistency measure, in which the inconsistency measure of a pair of media clips is calculated using at least three relative time offsets and one of the at least three relative time offsets is a relative time offset of the pair of media clips, and synchronizing the plurality of media clips based on resulting calculated inconsistency measures.

20 Claims, 4 Drawing Sheets

(56) References Cited

OTHER PUBLICATIONS

Cremer, Markus, and Randall Cook, "Machine-Assisted Editing of User-Generated Content", SPIE-IS&T, vol. 7254, pp. 1-8, Electronic Imaging, International Society for Optics and Photonics, 2009.
Kennedy, Lyndon, and Mor Naaman, "Less Talk, More Rock: Automated Organization of Community-Contributed Collections of Concert Videos", Proceedings of the 18th international conference on World wide web, ACM, 2009, 10 pages.
Shrestha, Prarthana, Mauro Barbieri, and Hans Weda, "Synchronization of Multi-Camera Video Recordings Based on Audio", Proceedings of the 15th international conference on Multimedia, ACM, 2007, pp. 545-548.
Lowe D. G., "Distinctive Image Features from Scale-Invariant Keypoints", International Journal of Computer Vision, 2004, pp. 91-110, 60(2):91-110, Kluwer Academic Publishers, The Netherlands.
Agarwal, S. et al., "Building Rome in a Day", Communications of the ACM, Oct. 2011, pp. 105-112, vol. 54, No. 10, Originally published in Proceedings of the 2009 IEEE International Conference on Computer Vision, pp. 72-79. IEEE, 2009. 1.

* cited by examiner

US 10,108,254 B1

APPARATUS AND METHOD FOR TEMPORAL SYNCHRONIZATION OF MULTIPLE SIGNALS

TECHNICAL FIELD

This disclosure relates to the field of media content and, in particular, to temporally synchronizing media clips collected by different sensors pertaining to an event.

BACKGROUND

Consumers equipped with mobile devices such as smart phones and camcorders may record media clips (video or audio clips) of an event and upload these media clips of the event to a content sharing platform. Unlike professional multi-camera recordings that are commonly recorded in a time synchronized manner, these media clips captured by consumers are recorded independently by diverse devices. Furthermore, although these media clips may be captured pertaining to the same event, consumers may start to capture their respective media clips at different starting times.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method including identifying a plurality of media clips pertaining to an event, calculating pairwise relative time offsets for pairs of media clips from the plurality of media clips, for each pair of the plurality of media clips, calculating, by a processing device, an inconsistency measure, in which the inconsistency measure of a pair of media clips is calculated using at least three relative time offsets and one of the at least three relative time offsets is a relative time offset of the pair of media clips, and synchronizing the plurality of media clips based on resulting calculated inconsistency measures.

Implementations of the disclosure may include a system including a memory and a processing device communicatively coupled to the processing device to identify a plurality of media clips pertaining to an event, calculate pairwise relative time offsets for the plurality of media clips, for each pair of the plurality of media clips, calculate, by the processing device, an inconsistency measure, in which the inconsistency measure of a pair of media clips is calculated using at least three relative time offsets and one of the at least three relative time offsets is a relative time offset of the pair of media clips, and synchronize the plurality of media clips based on the calculated inconsistency measures.

BRIEF DESCRIPTION OF THE DRAWINGS

The present disclosure is illustrated by way of example, and not by way of limitation, in the figures of the accompanying drawings.

DETAILED DESCRIPTION

Figure 1:
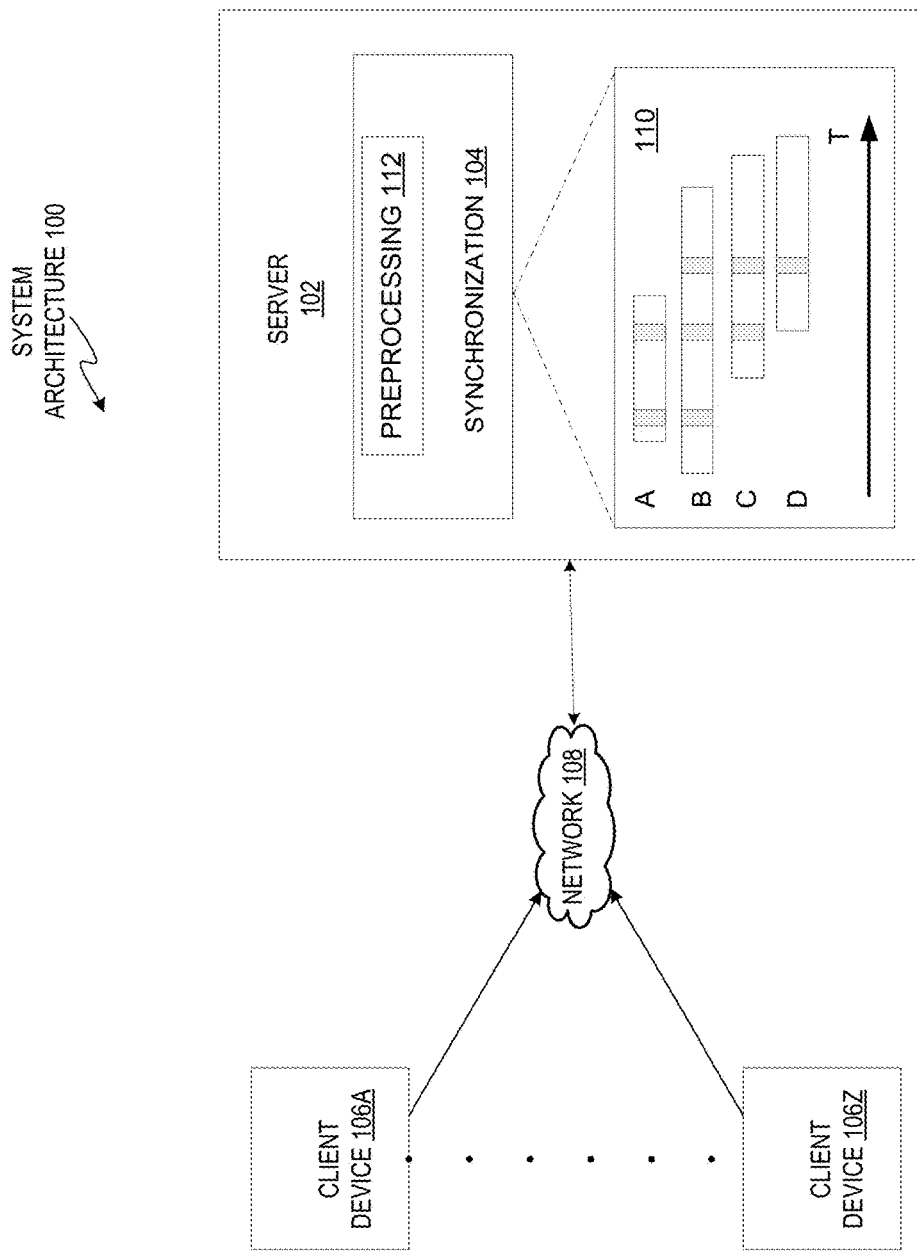
FIG. 1 illustrates a system architecture in which aspects of the present disclosure can be implemented.

Multiple media clips recorded at a particular event may be combined together to create enhanced user experience. For example, media clips captured by different cameras with respect to a sporting game may be combined to generate multiple views from different angles of a same play in a manner similar to broadcast replays. However, these media clips need to be time synchronized before any further processing. Media clips may include audio clips, video clips, and any signals (such as acceleration or orientation signals) that are recorded in a temporally sequential manner. Although the disclosure discusses media clips in the context of audio and/or video clips for the convenience of explanation, it is understood that media clips of implementations of the disclosure are not limited to audio/video clips. The media clips can be any signal that may be temporally synchronized. An audio clip may include a sound track recorded at an event. A video clip may include both a sequence of video frames and a sound track recorded at the event. Many of the current audio/video synchronization methods are focused on the synchronization between a pair of media clips. Such a pairwise synchronization can either operate in the visual domain by tracking and matching visual features between a pair of media clips over time or it can focus on a synchronization of audio signals of a pair of media clips in order to detect temporal offsets between audio/video content.

However, there may be a large number of multimedia clips of an event, and the synchronization of these media clips may present new challenges. For example, the recordings of the multiple media clips may not be consistent among all media clips. Since the media clips are recorded independently using diverse devices, they may not be properly aligned to a global time reference due to the system errors. Therefore, pairwise synchronization of all media clips may not generate a global synchronization that will align all of the multiple media clips stored in a content sharing platform. For example, any erroneous mismatch between one pair of media clips may propagate throughout the synchronization processing, inhibiting the generalization of a global synchronization of all media clips.

Moreover, media clips recorded at the event can be received on a continuous basis rather than all at one time. Therefore, a synchronization technique should be able to adapt to processing a continuously expanding collection of media clips of an event.

Implementations of the disclosure include synchronization systems and methods that may calculate an inconsistency measure for each pair of media clips pertaining to an event. The inconsistency measure of the pair may be derived from synchronization errors in a subgroup of the media clips that includes the pair.

Because the synchronization errors for media clips pertaining to an event are calculated locally using subgroups, any new media clips that are later added to the content sharing platform do not affect the results of the already calculated synchronization errors. Thus, the already calculated synchronization errors may be reused in the synchronization of the newly added media clips. Additionally, since the inconsistency measure takes into consideration all subgroups of media clips that include the pair, the synchronization problem may be resolved globally even if there is an error in pairwise matching. Further, implementations of the disclosure take advantage of minimum-spanning tree (MST) algorithms that can be implemented efficiently. Therefore, aspects of the implementations are particularly advantageous for a large number of synchronizing media clips stored on a content sharing platform.

FIG. 1 illustrates a system architecture in which aspects of the present disclosure can be implemented. The architecture 100 may include a server 102 102 which may be connected to client devices 106A through 106Z a network 108.

Network 108 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data.

The client devices 106A through 106Z may each include computing devices such as personal computers (PCs), laptops, mobile phones, smart phones, tablet computers, netbook computers, etc. In some implementations, client device 106A through 106Z may also be referred to as "user devices."

In one example, server 102 may be part of a content sharing platform and users of client devices 106A through 106Z may retrieve and watch contents stored on the content sharing platform. In this example, each client device may include a media viewer (not shown). In one implementation, the media viewers may be applications that allow users to view content, such as images, videos, web pages, documents, etc. For example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant).

In another example, the media viewer may be a standalone application (e.g., a mobile app) that allows users to view digital media items (e.g., digital videos, digital images, electronic books, etc.).

In yet another example, the media viewer of client devices 106A through 106Z may include software modules that allow client devices 106A through 106Z to upload user-generated contents to the content sharing platform 102 via network 108. For example, client devices 106A through 106Z may include hardware capabilities (such as microphones and cameras) to record media contents (audio/video clips). Further, the media view of client devices 106A through 106Z may include a software plug-in that allows a user to select and upload media contents to the content sharing platform 102.

The media viewers may be provided to the client devices 106A-106Z by the content sharing platform. For example, the media viewers may be applications that are downloaded from the content sharing platform or a third-party app store.

In general, functions described in one implementation as being performed by the server 102 can also be performed on a different computer system (e.g., client device 106) in other implementations if appropriate. In addition, the functionality attributed to a particular component can be performed by different or multiple components operating together. The server 102 can also be accessed as a service provided to other systems or devices through appropriate application programming interfaces, and thus is not limited to use in websites.

In one implementation, the server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to automatically edit media items provided by users of client devices 106, create metadata for media items provided by users of client devices 106, provide users with access to media items including, for example, allowing a user to consume, upload, search for, approve of ("like"), dislike, and/or comment on media items.

A media item may be consumed via the Internet and/or via a mobile device application. For brevity and simplicity, an online video (also hereinafter referred to as a video) is used as an example of a media item throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 102 may store hyperlinks to the media items stored on the data stores.

According to some aspects, some or all client devices 106 can include cameras that can record an event (e.g., a meeting, a conference, a stage performance, a sports game, etc.). For example, a client device 106 can be a mobile phone or a tablet that has a built-in camera capable of capturing a video. In addition or alternatively, some client devices can be independent cameras (e.g., camcorders or video camera recorders) that can capture an event and provide resulting media clips to the server 102. For example, media clips can be uploaded to the server 102 directly from a camera (e.g., via a WiFi connection) or by connecting a camera to another user device (e.g., a personal computer or a tablet) and uploading media clips to the server 120 through that other user device.

In one implementation, the server 102 may receive uploads of media clips (e.g., 110.A through 110.D) independently recorded at an event. These media clips 110.A through 110.D may be in the form of raw audio/video clips that are not time synchronized with respect to a global time reference T. In other words, the true time offsets between media clips are not known. While these media clips are not time synchronized, they pertain to a specific event, and thereby are capable of being synchronized with respect to the global time reference T.

The server 102 may host a synchronization subsystem 104 that is responsible for synchronizing the media clips 110. The synchronization subsystem 104 can include a preprocessing module 112 that can determine that the media clips 110 pertain to the same event. The determination may be based on metadata associated with the media clips. The synchronization subsystem 104 can then align media clips 110.A through 110.D with respect to a global time reference T. The synchronized media clips may be consumed by users using client devices 106A through 106Z, and may facilitate video classification, video searching, ad targeting, spam and abuse detection, content rating, etc.

According to some aspects of the present disclosure, the preprocessing module 112 may also perform operations such as feature detection and may then calculate the relative time offsets between two media clips based on these features. Since each media clip may be recorded independently from other media clips, the start times of media clips with respect to a global time references may be unknown. However, the relative time offsets between two media clips may be estimated by preprocessing module 112 through feature detection and cross-correlation based on the detected features.

In one implementation, preprocessing module 112 may first extract sound tracks from media clips 110 and compute audio features of the sound tracks pertaining to an event. Audio features may include zero crossing rate, spectral flatness coefficients, mel-frequency cepstral coefficients, normalized energy, etc. which emphasizes descriptive characteristics of the sound tracks and hereby provides increased robustness to noise. Since the sound tracks may be sampled at a sampling rate, for each media clip, the audio features may be calculated at each sample point along the time axis. Thus, the audio signal of a media clip is a sequence of data samples. In one implementation, the preprocessing module 112 may calculate a cross-correlation function between the audio features of a pair of media clips and determine the relative time offset between the media clips based on the location of the maximum peak values in the cross-correlation function. The cross-correlation function of two signals (such as the sampled audio features) is a sliding dot product of the two signals. The cross-correlation function measures the similarity of the two signals. A maximum value of the cross-correlation function indicates a corresponding time instant at which the two signals are best matched. Thus, the relative time offset between a first signal and a second signal may be determined by measuring from the best matching time of the cross-correlation function to a starting time of the first signal assuming the second signal is the one sliding with respect to the first signal.

For each pair of media clips, preprocessing module 112 may calculate a relative time offset between the two media clips in the pair. The synchronization subsystem 104 may determine an optimal synchronization for all media clips based on the relative time offsets among all pairs of media clip. In the following, graphs are used to facilitate the illustration. However, implementations of the disclosure are not limited by the particular way of illustration.

FIGS. 2A-2D illustrate graphs that facilitate the calculation of inconsistency measures according to implementations of the disclosure. A number (N) of media clips of an event may be stored in a data store coupled with the server 102. A graph including N nodes may be used to illustrate the relationship among these media clips. For the ease of illustration, FIGS. 2A-2D illustrate a graph including nodes A though D each of which may represent a corresponding media clip A through D.

Figure 2:
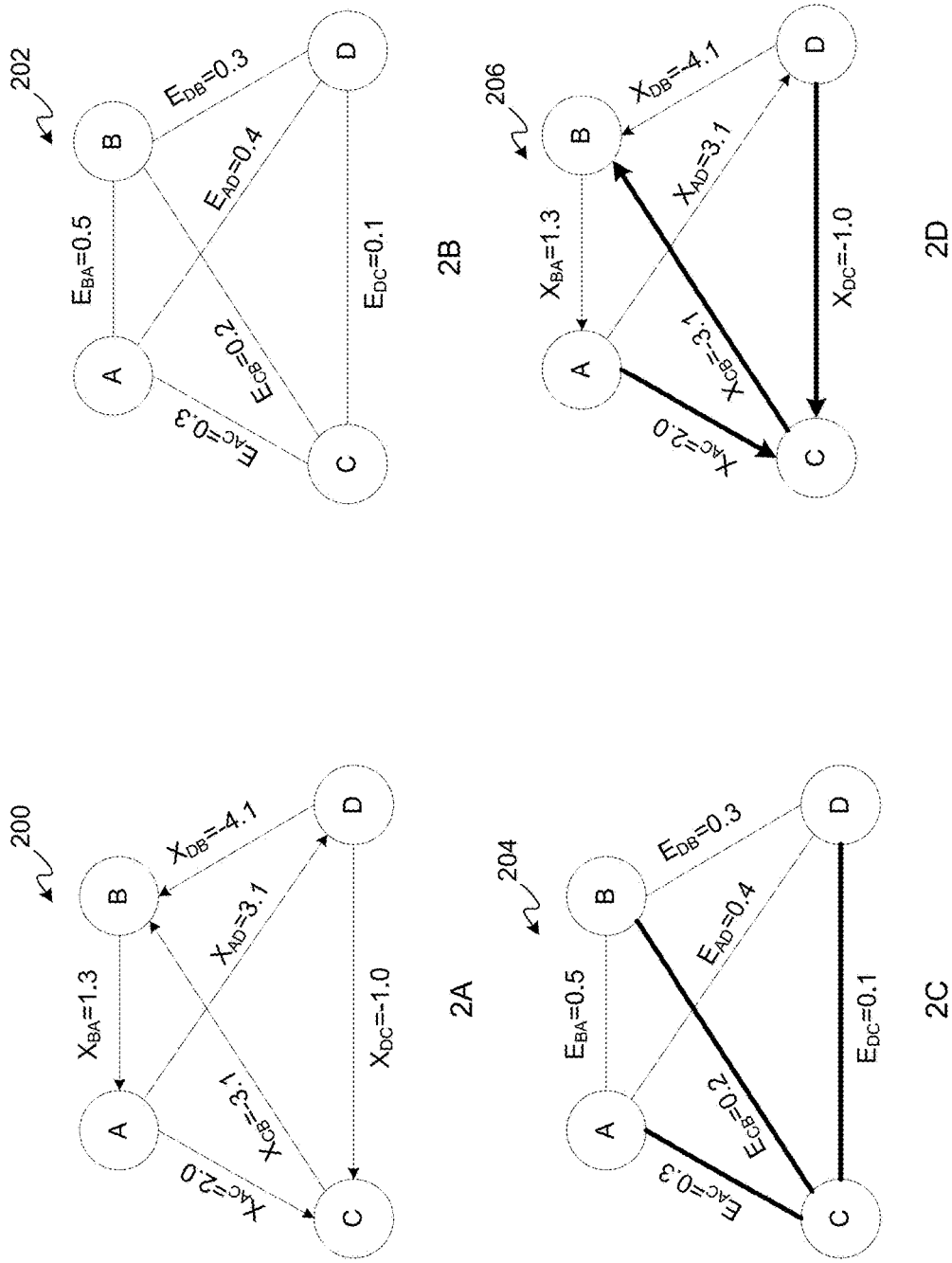
FIGS. 2A-2D illustrate graphs that facilitate the calculation of inconsistency measures according to implementations of the disclosure.

Referring to FIG. 2A, each pair of nodes may be connected by an edge to form a fully-connected graph 200 between all nodes (or corresponding media clips). The objective is to determine a set of time offsets between the media clips with minimum global error. To this end, an estimate of the relative time offset between two nodes may be calculated for each pair of nodes. The estimate may be calculated by pairwise matching based on audio features as discussed above using the preprocessing module. Each edge of the graph may be assigned with an estimated time offset. For the example of FIG. 2A, they are $X_{BA}=1.3$, $X_{AC}=2.0$, $X_{CB}=-3.1$, $X_{AD}=3.1$, $X_{DC}=-1.0$, $X_{DB}=4.1$. The time offset may be measured in seconds (s), or milliseconds (ms), or any linear time unit. For N nodes, the pairwise matching may generate over-determined N*(N−1)/2 estimates of time offsets for the fully-connected graph 200. However, N−1 estimates (or edges) may be sufficient to produce a global synchronization solution of N media clips. The N−1 estimates may be the edges of a minimum-spanning tree of the fully-connected graph 200.

The global synchronization may be determined by selecting a tree traversing all the nodes with minimum edge weights (the minimum-spanning tree). This can be achieved by repeatedly selecting the cheapest unselected edge within the graph which does not form a cycle in the resulting tree subgraph. In one implementation, the edge weights may be defined as a function of the maximum value of the cross-correlation between the pair of nodes. It is observed that time offsets along edges that form a circle in the fully-connected graph should be theoretically summed to zero. However, since real measurements are not error-free, the circles of nodes may be summed to non-zero values or residual errors. Therefore, a penalty score of a given M-clique (a subgraph of M nodes that form a complete subgraph within a graph of N nodes, where N is greater than or equals to M) in the graph may be defined as the absolute sum of circling edges of M nodes. In one implementation, the penalty score (or a residual error) $Z_{ijk}$ of a given 3-clique in the graph as circle of nodes may be calculated as:

$$Z_{ijk}=|X_{ij}+X_{jk}+X_{ki}| \quad (1)$$

where i, j, k are indices for nodes, and $X_{ij}$, $X_{jk}$, and $X_{ki}$ are the estimated time offsets between two nodes. For any given edge of an N-node graph, there may be N−2 3-cliques that include the edge. In one implementation, an inconsistency measure for an edge between nodes i, j, may be defined in terms of 3-cliques that include the edge as $$e_{ij} = \sum_{k} Z_{ijk} \quad (2)$$

where k represents indices over all possible N−2 penalty scores for edge ij.

Accordingly, as shown in FIG. 2B, a new fully-connected graph 202 may be constructed in which the edge weights are assigned according to the inconsistency measure $Z_{ijk}$. In one implementation, the inconsistency measure for an edge may be calculated using 3-cliques that include the edge. In another implementation, the inconsistency measure may be calculated according to M-cliques that include the edge, where M can be an integer larger than three. In yet another implementation, the inconsistency measure may be calculated according to a mixture of V-cliques that include the edge, where V can be any integer values of at least three. For the example as shown in FIG. 2B, the inconsistency measures ($E_{AC}$, $E_{BA}$, $E_{CB}$, $E_{DC}$, $E_{AD}$, $E_{DB}$) are calculated using 3-cliques.

The N−1 most consistent edges (or those that generate least inconsistencies) may be computed based on the fully-connected graph including edges weighted with inconsistency measures as shown in FIG. 2B. In one implementation, the Prim's minimum-spanning tree (MST) algorithm may be applied to select the N−1 edges that span the nodes in the inconsistency graph 202. The algorithm may start with the edge with the least inconsistency measure ($E_{DC}$) and continue searching for the edge with the next least inconsistent measure that does not form a clique ($E_{CB}$, $E_{AC}$) to form the MST ($E_{DC}$, $E_{CB}$, $E_{AC}$) shown as the bold edges in FIG. 2C.

Thus, the MST ($E_{DC}$, $E_{CB}$, $E_{AC}$) of the fully-connected graph 204 as shown in FIG. 2C may represent the most consistent synchronization with respect to the inconsistency measure as defined. This MST may be mapped back to graph 200 to determine the N−1 relative time offsets that produce the most consistent synchronization. As shown in FIG. 2D, the time offsets for the synchronization may be $X_{AC}$, $X_{CB}$, $X_{DC}$ which may be used to determine a global synchronization. In one implementation, one media clip (e.g., A) may be selected and the time references of other media clips may be adjusted using the selected time offsets with respect to A.

Figure 3:
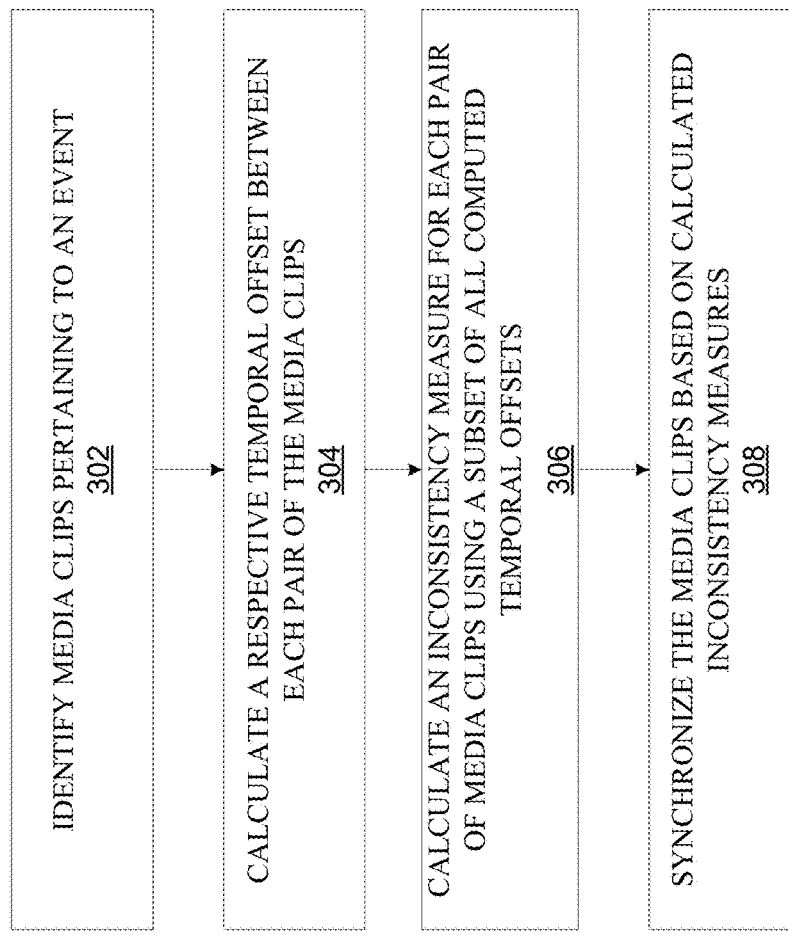
FIG. 3 illustrates a flow diagram of a method to perform synchronization of media clips according to implementations of the disclosure.

FIG. 3 illustrates a flow diagram of a method 300 for synchronizing multimedia clips recorded at an event according to some implementations of the disclosure. The method may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the method may be performed by the synchronization subsystem 104 as shown in FIG. 1.

Referring to FIG. 3, at 302, a preprocessing module 112 of the synchronization subsystem 104 may identify N media clips pertaining to an event. These media clips may include audio and/or video clips independently recorded at the event. Since these media clips were recorded independently, they may need to be temporally aligned.

At 304, the preprocessing module of the synchronization subsystem may calculate a respective relative time offset between each pair of media clips of the N media clips. The preprocessing module 112 may first extract audio features from the pair of media clips and then calculate cross-correlation of the audio features of the pair of media clips. The relative time offset between the pair of media clips may be determined based on peak values of the cross-correlation function. Since there are N media clips, there are $N*(N-1)/2$ pairwise relative time offsets among the N media clips.

At 306, the synchronization subsystem 104 may calculate an inconsistency measure for each pair of media clips among the N media clips. In one implementation, the inconsistency measure of each pair of media clips is calculated using at least three relative time offsets. In particular, as discussed above in conjunction with FIGS. 2A-2D, the inconsistency measure may be calculated as a sum of penalty scores as defined in Equations (2) above, in which the penalty score from relative time offsets as defined in Equation (1) above.

At 308, the synchronization subsystem 104 may search for a subset of inconsistency measures that may form a least inconsistent minimum-spanning tree (MST). The branch of the MST may correspond to a time offset between two media clips. The synchronization may use one media clip as a reference, and then adjust time references of all other media clips based on the time offsets determined by the MST.

In one implementation, the media clips of an event may be divided into groups of media clips. The media clips within each group may be overlapping in time, but there is no overlapping between different groups. The synchronization within each group of media clips may be achieved using the minimum-spanning tree (MST) as described in conjunction with FIG. 3. Further, the MSTs of all groups of media clips may form a minimum-spanning forest.

In one implementation, a spatial adjacency between capturing devices may be used to calculate a reliability measure for calculation of the relative time offset between the two capturing devices. The distance between the capture devices may be derived from GPS information, WiFi positioning systems, manually-provided distance information, or from inferred 3D camera position from computer vision techniques when video is available. In one implementation, the reliability measure is inversely related to the distance, i.e, the closer the two devices, the higher the reliability measure (or more reliable) of the calculated time offset. In one implementation, the reliability measure may be used as a weight that is multiplied with the calculated relative time offset between the two media clips of the pair.

In situations in which the systems discussed herein collect personal information about users, or make use of personal information, the users may be provided with an opportunity to control whether the content server collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content server.

Figure 4:
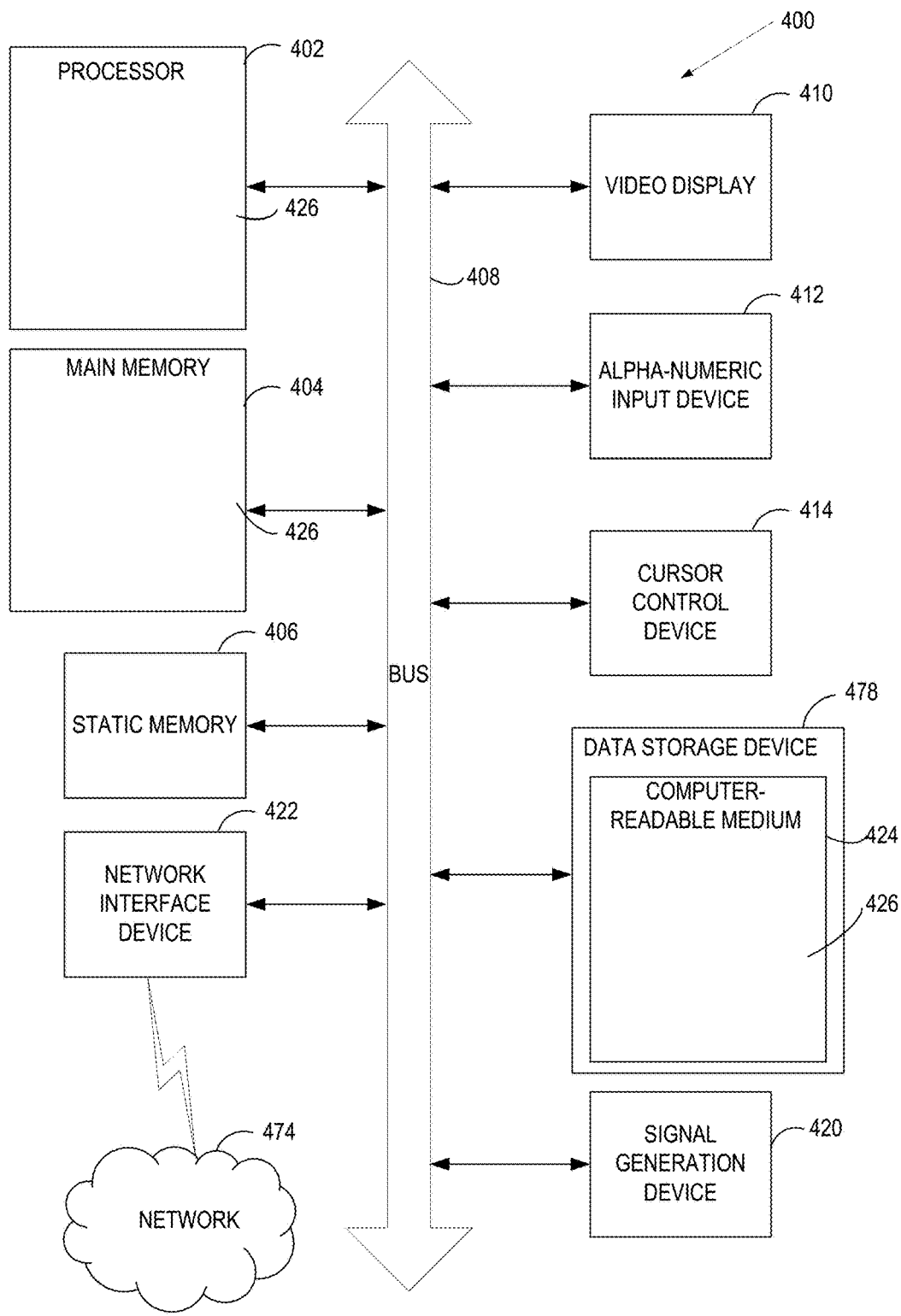
FIG. 4 is a block diagram illustrating an exemplary computer system, according to some implementations of the disclosure.

FIG. 4 illustrates a diagrammatic representation of a machine in the exemplary form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., instructions of the annotation subsystem 112). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying a plurality of media clips pertaining to an event, wherein the plurality of media clips are recorded independently;
   constructing a graph comprising a plurality of nodes and a plurality of edges, wherein a node of the plurality of nodes is to represent a respective one of the plurality of media clips, and wherein an edge of the plurality of edges connects a pair of nodes of the plurality of nodes;
   calculating, by a processing device, a plurality of time offsets corresponding to the plurality of edges, wherein each of the plurality of time offsets corresponds to a pair of media clips of the identified media clips;
   calculating, by the processing device, a plurality of inconsistency measures for the plurality of edges, wherein calculating the inconsistency measures comprises:
      constructing, for a respective edge of the plurality of edges, a plurality of subgraphs of the graph, wherein each subgraph of the plurality of subgraphs comprises the respective edge and at least two other edges of the plurality of edges;
      calculating, based on a combination of a subset of the plurality of time offsets, a residual error associated with a corresponding subgraph of the plurality of subgraphs, the subset comprising at least three time offsets of the plurality of time offsets that correspond to the respective edge and the at least two other edges; and
      calculating, based on the residual error associated with the corresponding subgraph, one of the inconsistency measures; and
   synchronizing the plurality of media clips based on the inconsistency measures.

2. The method of claim 1, wherein the plurality of media clips include video clips captured by independent sensors.

3. The method of claim 1, wherein the respective edge corresponds to a first time offset of a first pair of media clips, and wherein the at least two other edges correspond to time offsets of other pairs of media clips that are related the first pair of media clips.

4. The method of claim 1, wherein calculating the time offsets comprises:
   calculating a cross-correlation function for the each pair of the plurality of media clips; and
   determining a respective time offset of the plurality of time offsets based on a peak value of the cross-correlation function.

5. The method of claim 1, wherein calculating the inconsistency measures comprises:
   for each of the plurality of edges,
      constructing a plurality of 3-clique subgraphs comprising the edge and two other edges;
      calculating a residual error associated with a corresponding subgraph of the plurality of 3-clique subgraphs that includes the edge by absolute-summing three relative time offsets corresponding to three edges forming the corresponding 3-clique subgraph; and
      calculating the inconsistency measure for the edge by summing residual errors of all 3-clique subgraphs associated with the edge.

6. The method of claim 1, wherein synchronizing the plurality of media clips comprises:
   determining a minimum-spanning tree for the graph by selecting a set of edges in the graph that minimize the inconsistency measures and form a tree structure.

7. The method of claim 1, further comprising:
   for each pair of the media clips,
      calculating a reliability measure, wherein the reliability measure is inversely related to a spatial distance between two sensors capturing the two media clips in the each pair of media clips;
      applying the reliability measure as a weight to the corresponding time offset.

8. A non-transitory machine-readable storage medium storing instructions which, when executed, cause a processing device to perform operations comprising:
   identifying a plurality of media clips pertaining to an event, wherein the plurality of media clips are recorded independently;
   constructing a graph comprising a plurality of nodes and a plurality of edges, wherein a node of the plurality of nodes is to represent a respective one of the plurality of media clips, and wherein an edge of the plurality of edges connects a pair of nodes of the plurality of nodes,
   calculating, by the processing device, a plurality of time offsets corresponding to the plurality of edges, wherein each of the plurality of time offsets corresponds to a pair of media clips of the identified media clips;
   calculating, by the processing device, a plurality of inconsistency measures for the plurality of edges, wherein calculating the inconsistency measures comprises:
      constructing, for a respective edge of the plurality of edges, a plurality of subgraphs of the graph, wherein each subgraph of the plurality of subgraphs comprises the respective edge and at least two other edges of the plurality of edges;
      calculating, based on a combination of a subset of the plurality of time offsets, a residual error associated with a corresponding subgraph of the plurality of subgraphs, the subset comprising at least three time offsets of the plurality of time offsets that correspond to the respective edge and the at least two other edges; and
      calculating, based on the residual error associated with the corresponding subgraph, one of the inconsistency measures; and
   synchronizing the plurality of media clips based on the inconsistency measures.

9. The machine-readable storage medium of claim 8, wherein the plurality of media clips include video clips captured by independent sensors.

10. The machine-readable storage medium of claim 8, wherein the respective edge corresponds to a first time offset of a first pair of media clips, and wherein the at least two other edges correspond to time offsets of other pairs of media clips that are related the first pair of media clips.

11. The machine-readable storage medium of claim 8, wherein the processing device is a content sharing platform.

12. The machined-readable storage medium of claim 8, wherein calculating the time offsets comprises:
calculating a cross-correlation function for the each pair of the plurality of media clips;
determining a respective time offset of the plurality of time offsets based on a peak value of the cross-correlation function.

13. The machine-readable storage medium of claim 8, wherein calculating the inconsistency measures comprises:
for each of the plurality of edges,
constructing a plurality of 3-clique subgraphs comprising the edge and two other edges;
calculating a residual error associated with a corresponding subgraph of the plurality of 3-clique subgraphs that includes the edge by absolute-summing three relative time offsets corresponding to three edges forming the corresponding 3-clique subgraph; and
calculating the inconsistency measure for the edge by summing residual errors of all 3-clique subgraphs associated with the each edge.

14. The machine-readable storage medium of claim 8, wherein determining the synchronization comprises:
determining a minimum-spanning tree for the graph that by selecting a set of edges in the graph that minimize the inconsistency measures and form a tree structure.

15. A system, comprising:
a memory; and
a processing device operatively coupled to the memory, to:
identify a plurality of media clips pertaining to an event, wherein the plurality of media clips are recorded independently;
construct a graph comprising a plurality of nodes and a plurality of edges, wherein a node of the plurality of nodes is to represent a respective one of the plurality of media clips, and wherein an edge of the plurality of edges connects a pair of nodes of the plurality of nodes;
calculate, by the processing device, a plurality of inconsistency measures for the plurality of edges, wherein to calculate the inconsistency measures, the processing device is further to:
construct, for a respective edge of the plurality of edges, a plurality of subgraphs of the graph, wherein each subgraph of the plurality of subgraphs comprises the respective edge and at least two other edges of the plurality of edges;
calculate, based on a combination of a subset of the plurality of time offsets, a residual error associated with a corresponding subgraph of the plurality of subgraphs, the subset comprising at least three time offsets of the plurality of time offsets that correspond to the respective edge and the at least two other edges; and
calculate, based on the residual error associated with the corresponding subgraph, one of the inconsistency measures; and
synchronize the plurality of media clips based on the inconsistency measures.

16. The system of claim 15, wherein the plurality of media clips include video clips captured by independent sensors.

17. The system of claim 15, wherein the respective edge corresponds to a first time offset of a first pair of media clips, and wherein the at least two other edges correspond to time offsets of other pairs of media clips that are related the first pair of media clips.

18. The system of claim 15, wherein the processing device is a content sharing platform.

19. The system of claim 15, wherein to calculate the time offsets, the processing device is further to:
calculate a cross-correlation function for the each pair of the plurality of media clips;
determine a respective time offset of the plurality of time offsets based on a peak value of the cross-correlation function.

20. The system of claim 15, wherein to calculate the inconsistency measures, the processing device is further to:
for each of the plurality of edges,
construct a plurality of 3-clique subgraphs comprising edge and two other edges;
calculate a residual error associated with a corresponding subgraph of the plurality of 3-clique subgraph that includes the edge by absolute-summing three relative time offsets corresponding to three edges forming the corresponding 3-clique subgraph; and
calculate the inconsistency measure for the edge by summing residual errors of all 3-clique subgraphs associated with the edge.

* * * * *